United States Patent Office 3,158,826
Patented Nov. 24, 1964

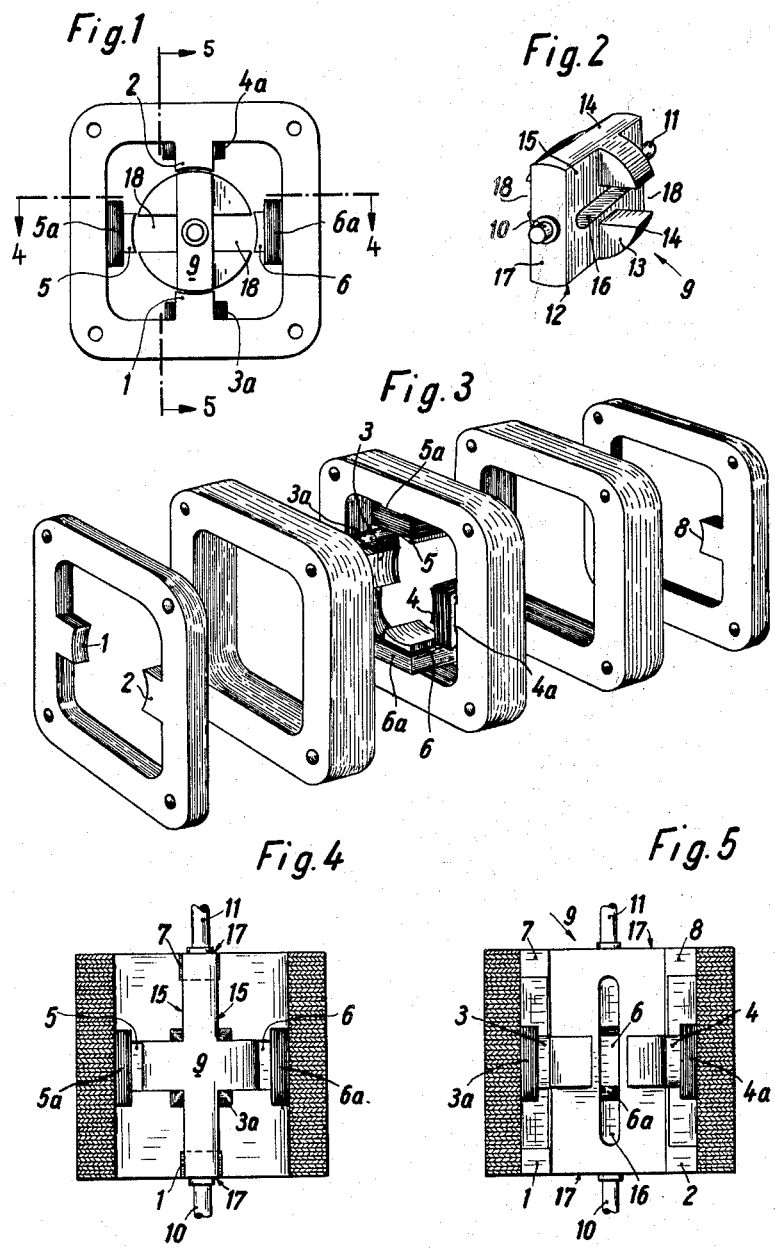

3,158,826
ANGULAR POSITION SIGNAL GENERATOR
Rudolf Beck, Konigstein, Taunus, Germany, assignor to Hans J. Zimmer Verfahrenstechnik, Frankfurt am Main, Germany
Filed Mar. 4, 1963, Ser. No. 262,703
Claims priority, application Germany, Mar. 5, 1962, Z 9,268
5 Claims. (Cl. 336—30)

The present invention relates to a device for producing an electrical signal which is a function of the angular position of a shaft, which device incorporates a stator core having a plurality of pole pairs which carry windings and a windingless rotor which is rotatably mounted between the pole pairs.

In the control art it is frequently necessary to transmit the angular position of a mechanical shaft or to generate an electrical signal which is proportional to the angular position of the shaft.

There exist so-called remote control synchros which accomplish this task, but they require a rotor carrying a winding from which the signals are taken off via slip rings. Experience has shown that such synchros are not always reliable, particularly under severe operating conditions.

There also exist angular position signal generators which operate without slip rings. Such signal generators generally comprise a stator core having pole shoes, which carry, alternately, input and output windings. A rotatable rotor couples the input and output windings in such a manner that, when the rotor occupies a given angular position, the voltages induced across the secondary windings exactly cancel each other, while in the other positions of the rotor an alternating voltage can be taken off the output windings, the amplitude and phase of which alternating voltage will depend on the particular position of the rotor. Such slipringless angular position signal generators have the drawback that the region in which the signal is proportional to the angular position of the shaft is quite small, often no greater than 3°. Furthermore, the non-homogeneity of the magnet field between the rotor and stator has very often been found to produce an undesired effect on the shaft whose angular position is to be measured, i.e., the electrical components which are intended merely to produce an electrical signal which is indicative of the angular position of the shaft act to affect this angular position.

It is, therefore, an object of the present invention to provide an angular position generator which overcomes the above drawbacks, namely, an angular position signal generator which is reliable in operation, which is able to operate linearly over a wide angular range, which itself consumes little energy, and which does not have any influence on the position of the shaft, i.e., which simply generates a signal representative of the angular position without, however, exerting forces on the shaft.

With the above object in view, the present invention resides, basically, in a device for generating an electrical signal which is a function of the angular position of a shaft, which device comprises a rotor carried by the shaft and a stator having at least two pairs of main poles surrounding the rotor, each of which pole pairs comprises two opposite main poles. The stator further has two supplemental poles which are arranged axially spaced from and on opposite sides, respectively, of one of the two main poles of one of the pairs, and two further supplemental poles which are arranged axially spaced from and on opposite sides, respectively, of the other main pole of the one pair. The rotor comprises means for establishing between the main and supplemental poles magnetic paths of different magnetic reluctances depending on the angular position of the rotor with respect to the stator, as a result of which a signal generator is obtained whose rotor does not have to carry any windings whatsoever.

In a preferred embodiment of the present invention, the rotor has a circular disk portion and a plate portion which extends at right angles to the disk portion, is symmetrical with respect to a diameter of the latter, and has edge surfaces which are part of a cylindrical surface to form a continuation with the peripheral edge of the disk portion. The plate portion has an axially extending symmetrical slot whose ends are spaced from the end faces of the plate portion, and the disk portion has, in the plane of, i.e., generally in alignment with, the slot, two recesses on opposite sides of the plate portion, respectively. The disk portion of the rotor is in axial alignment with the main poles of the stator, and the plate portion is axially of sufficient length to extend from the supplemental poles on one side of the main poles to the supplemental poles on the other side of the main poles. These recesses have, in circumferential direction, a width which is at most equal to the circumferential width of the main poles.

Additional objects and advantages of the present invention will become apparent upon consideration of the following description when taken in conjunction with the accompanying drawings in which:

FIGURE 1 is a front view of a stator and rotor of an angular position signal generator according to the present invention.

FIGURE 2 is a perspective view of the rotor.

FIGURE 3 is an exploded perspective view of the stator.

FIGURE 4 is a sectional view taken on line 4—4 of FIGURE 1.

FIGURE 5 is a sectional view taken on line 5—5 of FIGURE 1.

Referring now to the drawings, the same show the angular position signal generator as comprising a stator having four symmetrically arranged main poles 3, 4, 5, 6, carrying windings 3a, 4a, 5a, 6a, respectively. Each pair of oppositely arranged windings are connected together, one pair of windings constituting the input or primary windings and the other pair of windings the output or secondary windings. The primary windings have an alternating voltage of suitable amplitude and frequency applied to them, as, for example, an alternating voltage of 220 v. having a frequency of 50 c.p.s. A signal is taken off the secondary windings, the amplitude and phase position of which signal corresponds to the angular position of the rotor.

The stator core, whose structure is best seen from FIGURE 3, additionally has supplemental pole pairs 1, 2, 7, 8, which are arranged axially spaced from and on opposite sides of the poles 3, 4. The main poles 3, 4, 5, 6, have a preferably square cross section, while the supplemnetal pole pairs 1, 2; 7, 8 have a rectangular cross section of the same width and half the thickness of the main poles. The coils 3a, 4a, are preferably connected so as to constitute the primary windings.

The rotor 9 is provided with trunnions or axle studs 10, 11, which are rotatably supported in any suitable manner (not shown). The rotor may be composed of axially stacked laminations or consist of a single piece of magnetically weak ferromagnetic material which is a poor conductor of electric current, such as a ferrite. The rotor has the shape of a plate portion 12 having a circular disk portion 13, the plate portion extending at right angles to the disk part and being symmetrical with respect to a diameter of the latter. The radial outer edge surfaces 14 of the plate portion 12 are part of a cylindrical surface, and, as shown, are flush with the outer periphery of the disk portion 13 so as to form continuations thereof. The plate portion is provided with a centrally located, axially extending slot 16 which passes all the way through the thickness of the plate, i.e., from one face 15 thereof to the other. The slot 16 does not, however, extend throughout the entire axial length of the plate part, instead, the ends of the slot are spaced from the end faces 17 of the plate portion. The cross section of the magnetic material between the ends of the slot 16 and the end faces 17 is preferably equal to approximately half the magnetic cross section of main poles 3, 4, 5, 6. As is apparent from the drawing, the disk portion 13 is in axial alignment with the main poles 3, 4, 5, 6, and the plate portion 12 is axially of sufficient length to extend from the supplemental poles 1, 2, on one side of the main poles 3, 4, to the supplemental poles 7, 8, on the other side of these main poles.

The axial dimension of the disk part, i.e., its thickness, is preferably equal to the axial dimension of the shoes of poles 3, 4, 5, 6. The disk portion is also provided, in the plane of the slot 16, with two symmetrical recesses 18 which extend to the plate portion and which, in circumferential direction, are maximally as wide as the poles 5, 6, carrying the secondary windings 5a, 6a. The slot 16 is narrower than the recesses 18. As shown in FIGURE 1, the width of the recesses is, in practice, preferably somewhat smaller than the width of the poles 5, 6. Thanks to this feature, the force required for setting the device is reduced and the freedom from feedback effect is improved, i.e., the electrical components forming part of the angular position signal generator will have less of an effect in changing the position of the rotor. Furthermore, the shape of the rotor makes it possible for the magnetic reluctance to be relatively large even in the null or zero position, so that the no-load current will be low.

The windings 3a, 4a, are wound in the same direction and connected in series; the same applies to the windings 5a, 6a. When the rotor is rotated to the right or left out of the zero position illustrated in FIGURE 1, the magnetic shunt between the pole 3 carrying winding 3a and the pole shoes 1, 7, as well as the magnetic shunt between the pole shoe 4 carrying winding 4a and the pole shoes 2, 8, is decreased (i.e., the magnetic reluctance of the path between poles 1, 3, 7, and of the path between poles 2, 4, 8 is increased), while at the same time the magnetic shunt between the pole shoe 3 and the pole shoe 5 carrying the secondary winding 5a (or pole shoe 6 carrying the secondary winding 6a, depending upon the direction of rotation) as well as the magnetic shunt between the pole shoe 4 carrying the secondary winding 4a and the pole shoe 6 (or pole shoe 5) is increased (i.e., the magnetic reluctance of the path between poles 3 and 5 (or 3 and 6) and of the path between poles 4 and 6 (or 4 and 5) is decreased). Consequently, an alternating voltage is induced in the secondary windings whose amplitude and phase position will, in the useful angular range of maximally ±45° with reference to the zero position, represent a definite measurement of the angular position of the shaft carrying the rotor. The relationship is substantially linear within a relatively large range on either side of the null position. Inasmuch as the inductance of the primary windings is large even in the zero position, there will, as stated above, be relatively small no-load currents.

It will be understood that the above description of the present invention is susceptible to various modifications, changes, and adaptations, and the same are intended to be comprehended within the meaning and range of equivalents of the appended claims.

What is claimed is:

1. A device for generating an electrical signal which is a function of the angular position of a shaft, said device comprising a rotor carried by the shaft and a stator having a plurality of poles surrounding said rotor; there being four main poles which are spaced apart equal angular distances and form two pole pairs each including two opposite poles, said stator further having four supplemental poles two of which are arranged axially spaced from and on opposite sides, respectively, of one of the main poles of one of said pole pairs, the remaining two further supplemental poles being arranged axially spaced from and on opposite sides, respectively, of the other of said main poles of said one pole pair; said rotor having a circular disk portion which has a peripheral edge surface and a plate portion which extends at right angles to said disk portion, is symmetrical with respect to a diameter of the latter, has end faces, and has edge surfaces that are part of a cylindrical surface to form a continuation with the peripheral edge surface of said disk portion, said plate portion having an axially extending symmetrical slot whose ends are spaced from the end faces of said plate portion, and said disk portion having, generally in alignment with said slot, two recesses on opposite sides of said plate portion, respectively, said recesses having, in circumferential direction, a width which is at most equal to the circumferential width of said main poles, said disk portion being in axial alignment with said main poles and said plate portion being axially of sufficient length to extend from the supplemental poles on one side of said main poles of said one pair to the supplemental poles on the other side of said last-mentioned main poles; each of said main poles carrying a winding, the windings of the main poles of one of said pole pairs being primary windings to which an alternating voltage is applied and the windings of the main poles of the other of said pole pairs being secondary windings from which are derived signals representing the angular position of the rotor, and hence of the shaft carrying said rotor.

2. A device as defined in claim 1 wherein said slot is narrower than said recesses.

3. A device as defined in claim 1 wherein the main poles which have said supplemental poles axially spaced therefrom are the main poles carrying said primary windings, and the other main poles are the main poles carrying said secondary windings.

4. A device as defined in claim 3 wherein each of said recesses has a circumferential width which is less than the circumferential width of one of the main poles carrying a secondary winding.

5. A device as defined in claim 3 wherein the cross section of said plate portion of said rotor, at the part thereof between its end faces and the ends of said slot, is equal to approximately one half of the cross section of one of the main poles carrying a primary winding.

References Cited by the Examiner

UNITED STATES PATENTS

| 2,399,343 | 4/46 | Godsey | 336—135 X |
| 2,991,438 | 7/61 | Dove | 336—30 |

FOREIGN PATENTS 50,202   10/39   France.

JOHN F. BURNS, *Primary Examiner.*